Jan. 12, 1932. H. FORNELIUS 1,841,175
ROLL ADJUSTING MEANS FOR ROLLING MILLS
Filed March 19, 1931
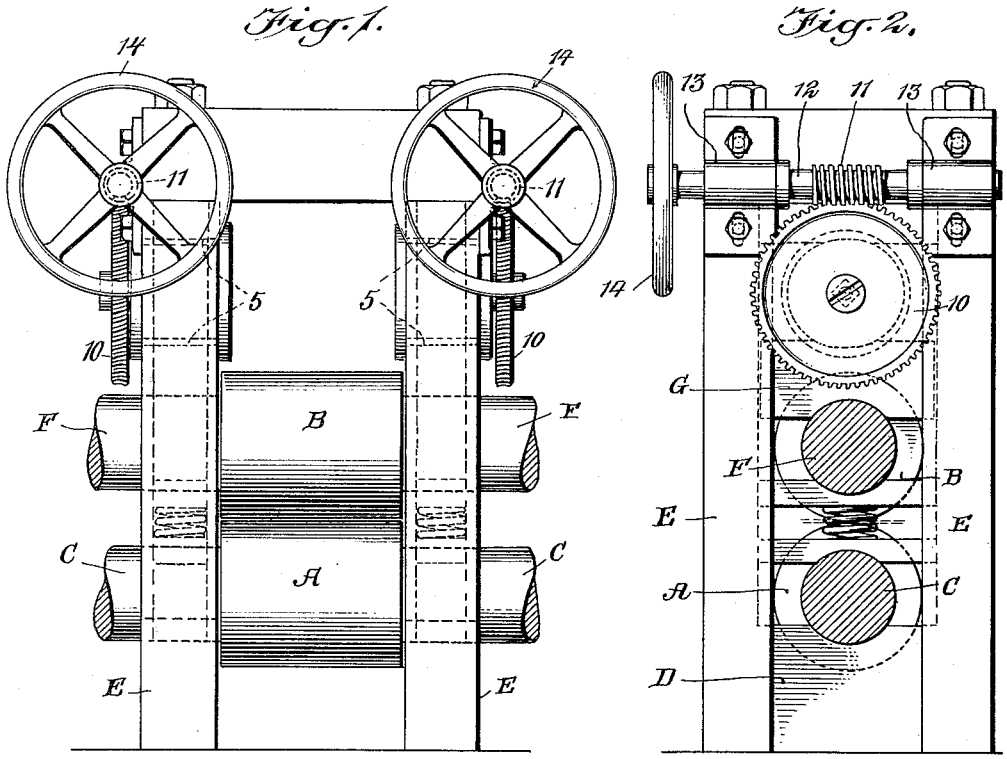
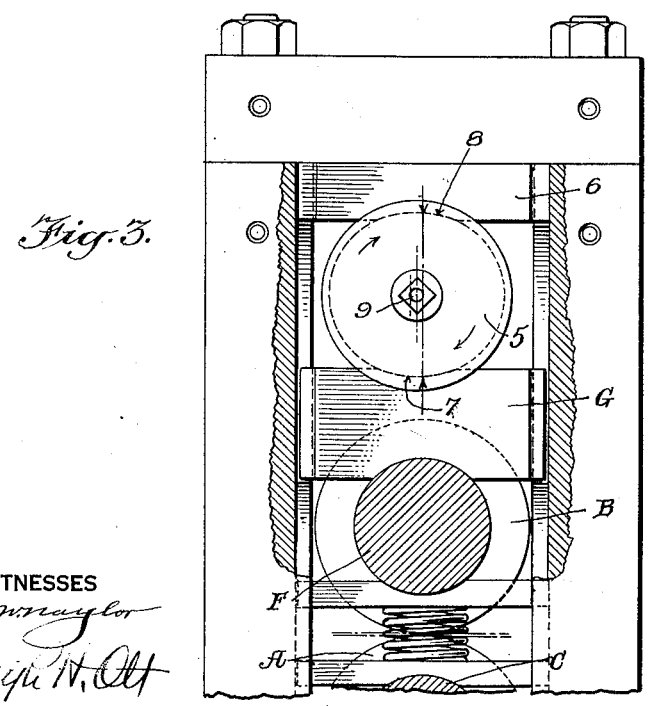

Patented Jan. 12, 1932

1,841,175

UNITED STATES PATENT OFFICE

HARVEY FORNELIUS, OF CLIFTON, NEW JERSEY, ASSIGNOR TO THE ATHENIA STEEL COMPANY, OF ATHENIA, CLIFTON, NEW JERSEY, A CORPORATION OF NEW JERSEY

ROLL ADJUSTING MEANS FOR ROLLING MILLS

Application filed March 19, 1931. Serial No. 523,860.

This invention relates to rolling mills, and has particular reference to an improved means for accomplishing the adjustment of the rolls with respect to each other.

Heretofore the adjustment of the rolls has been accomplished by pressure exerted directly upon the roll bearings by screws, and it has been observed that this adjustment lacks the necessary accuracy and precision, especially where the thickness of the product is required to be exact within thousandths of an inch and the inaccuracies have been traced to the "give" or lost motion between the screw threads, which increases as wear occurs thereon.

It is, therefore, the principal object of the present invention to provide an improved roll adjusting means for rolling mills which insures precision in the adjustment of the rolls and positively precludes any unintentional or accidental relative movement of the roller peripheries which tends to destroy their adjustment when once set.

More specifically, the invention resides in a roll adjustment for rolling mills, in which use is made of an eccentrically disposed rotary cam acting between a fixed bearing surface and the movable roll bearing which functions to positively preclude change of adjustment under working conditions.

Other objects of the invention reside in the comparative simplicity of construction of the roll adjusting means, the economy with which it may be produced and installed in a rolling mill, the durability of the means and the general efficiency derived therefrom.

With the above recited and other objects in view, reference is had to the following description and accompanying drawings, in which there is exhibited one example or embodiment of the invention, while the claims define the actual scope of the same.

In the drawings:

Figure 1 is a front view of a rolling mill equipped with a roll adjusting means constructed in accordance with the invention.

Figure 2 is a side view thereof.

Figure 3 is an enlarged fragmentary side view of the same with parts broken away and shown in section to disclose the underlying structure.

Referring to the drawings by characters of reference, A and B designate respectively the lower fixed and upper adjustable rolls, the former being driven and the latter an idler, and between the peripheries of which the material to be rolled is designed to be acted upon. As is customary in rolling mills, the idler roll B is mounted for relative adjustment toward and away from the roller A whereby the desired thickness of the rolled material may be obtained. As shown in the present instance, the lower driven fixed roll A is provided with trunnions or shaft portions C which project axially from the opposite ends thereof and which are journaled in bearings D disposed between the vertical pairs of frame members E. The roll B is likewise provided with trunnions or shaft portions F which project axially from the opposite ends thereof and upon which bearings G rest, the bearings being mounted for vertical shifting movement within the pairs of frame members E at opposite sides of the rolls.

In lieu of exerting direct pressure upon the bearings G by screws, as is the common practice, the present invention comprehends the use of a cam roller 5 which is interposed between the bearing G and a superposed fixed element 6 which is supported by the frame members E. The cam roller 5 is preferably of substantially oval shape in cross section, having a major and minor diameter and presenting gradually increasing diameters between said major and minor diameters so that upon turning of the cam roller, the bearing G is adjusted and maintained in accurately or precise adjusted position without possibility of change of adjustment when under working conditions. The movable bearing G and the fixed element 6 are respectivly formed with concaved recessed bearing surfaces 7 and 8 which intimately fit the periphery of the cam roller 5 and insure a direct thrust of the movable bearing G. It will also be observed that the bearing points of the cam roller 5 and the axis of rotation 9 are disposed in alignment with each other but slightly out of direct alignment with the line intersecting the axes of the rolls A and B. This further insures against accidental slippage or relative separative movement of the roll peripheries beyond the set adjustment. The axis 9 of the cam roller 5 carries a worm gear 10 with which a worm 11 on a worm shaft 12 meshes, the worm shaft being mounted in bearings 13 and being provided with a manipulating wheel or its equivalent 14, by virtue of which turning of the cam roller and adjustment of the adjustable roll is effected.

In view of the foregoing, it will thus be seen that an improved roll adjustment for rolling mills has been devised which insures accuracy and precision and avoids the possibility of accidental or unintentional change of adjustment while the mill is in operation.

While there has been illustrated and described a preferred embodiment of the invention, it is to be understood that no limitation is necessarily made to the precise structural details, as variations and modifications which properly fall within the scope of the claims may be resorted to if desired.

What is claimed is:

1. In a rolling mill, fixed and adjustable rolls, a movable bearing for effecting adjustment of said adjustable rolls, said bearing mounted for guided movement, a fixed bearing element spaced from the movable bearing and a rotatory cam member having diametrically opposite portions of its cam face engaging between said movable roll bearing and the fixed bearing element.

2. In a rolling mill, a driven roll, an idler roll, a fixed bearing for the driven roll, a vertically movable bearing for the idler roll, means for guiding the movable bearing, a fixed element spaced from the movable bearing and a rotatory oval cam roller having diametrically opposite points of its periphery respectively engaging said fixed element and the movable bearing for adjusting the movable roll and for maintaining the same in adjusted position.

3. In a rolling mill, a driven roll, an idler roll, a fixed bearing for the driven roll, a vertically movable bearing for the idler roll, means for guiding the movable bearing, a fixed element spaced from the movable bearing and a rotatory oval cam roller interposed between said fixed element and the movable bearing for adjusting the movable roll and for maintaining the same in adjusted position, said movable bearing and fixed element having concaved recessed bearing portions intimately fitting the periphery of the cam roller.

4. In a rolling mill, a driven roll, an idler roll, a fixed bearing for the driven roll, a vertically movable bearing for the idler roll, means for guiding the movable bearing, a fixed element spaced from the movable bearing and a rotatory oval cam roller interposed between said fixed element and the movable bearing for adjusting the movable roll and for maintaining the same in adjusted position, said movable bearing and fixed element having concaved recessed bearing portions itimately fitting the periphery of the cam roller and means for imparting turning motion to the cam roller.

5. In a rolling mill, a driven roll, an idler roll, a fixed bearing for the driven roll, a vertically movable bearing for the idler roll, means for guiding the movable bearing, a fixed element spaced from the movable bearing and a rotatory oval cam roller interposed between said fixed element and the movable bearing for adjusting the movable roll and for maintaining the same in adjusted position, said movable bearing and fixed element having concaved recessed bearing portions itimately fitting the periphery of the cam roller and means for imparting turning motion to the cam roller consisting of a worm and worm gear.

6. In a rolling mill, a driven roll, an idler roll, a fixed bearing for the driven roll, a vertically movable bearing for the idler roll, means for guiding the movable bearing, a fixed element spaced from the movable bearing and a rotatory oval cam roller interposed between said fixed element and the movable bearing for adjusting the movable roll and for maintaining the same in adjusted position, said movable bearing and fixed element having concaved recessed bearing portions intimately fitting the periphery of the cam roller, the axis of the cam roller being disposed out of direct alignment with the line of the axes of the rolls.

7. In a rolling mill, a lower driven roll, a superimposed idler roll, a fixed bearing for the lower roll, a vertically movable bearing for the upper roll, means for guiding the movable bearing, a fixed element spaced vertically with respect to said movable bearing and a rotatory substantially oval cam roller interposed between said fixed element and said movable bearing with diametrically opposite points of its periphery engaging the same for adjusting the movable roll and for maintaining the same in adjusted position.

8. In a rolling mill, fixed and adjustable rolls, a movable bearing for effecting adjustment of said adjustable roll, said bearing mounted for guided movement, a fixed element spaced from the movable bearing, and a rotatory cam engaging between said movable roll bearing and the fixed element, the points of engagement of the cam and its axis of rotation being disposed in alignment with each other and out of alignment with a line intersecting the axes of the rolls whereby to maintain the rolls in their relatively adjusted position.

HARVEY FORNELIUS.